3,230,750
FORMING AND HEAT TREATMENT OF SHEET-METAL ARTICLES WITH ORGANOPHILIC CATION-MODIFIED CLAY

Eric Anthony Horbury, Loughborough, Ronald Parkin, Quorn, and Albert Frederick Dix, Queniborough, England, assignors to Rolls-Royce Limited, Derby, England, a British company
No Drawing. Filed Sept. 13, 1963, Ser. No. 308,665
Claims priority, application Great Britain, Sept. 14, 1962, 35,152/62; May 31, 1963, 21,941/63
2 Claims. (Cl. 72—42)

This invention relates to the forming, and optional subsequent heat treatment, of metals. The term "metal" as used herein includes metallic alloys.

This invention provides a process for forming metals comprising, prior to forming, coating the metal with one or more layers of a sprayable coating composition comprising a mixture of an organophilic cation-modified clay (as hereinafter defined) and a volatile liquid organic vehicle therefor and removing substantially all the vehicle from the coating to leave a dry film of said clay on the metal, whereby the dry film will act as a lubricant during the forming.

Preferably, the coating composition also contains an additive which is a non-volatile organic substance having adhesive and/or lubricating properties and capable of forming a dry film when mixed with the organophilic cation-modified clay. If a heat treatment step subsequent to forming is contemplated it is usually essential for best results that such an additive be incorporated in the coating composition.

Thus, according to another aspect of the invention, particularly applicable to the deep drawing and subsequent heat treatment of ferrous, nickel and titanium based alloys, there is provided a process for treating metals comprising coating the metal with one or more layers of a sprayable coating composition comprising a mixture of an organophilic cation-modified clay (as hereinafter defined), an additive which is a non-volatile organic substance having adhesive and/or lubricating properties and capable of forming a dry film when mixed with the organophilic cation-modified clay, and a volatile liquid organic vehicle for said clay, removing substantially all the volatile vehicle from the coating to leave a dry film of said clay and additive on the metal, thereafter subjecting the coated metal to a forming operation and subsequently heat treating the formed metal at elevated temperature.

The term "organophilic cation-modified clay" as used herein means a clay modified by covering the greater part of the surface of the particles of the clay with alkyl or aryl organic radicals coupled to the clay ionically by means of an onium base.

An onium compound has been defined in Hackh's Chemical Dictionary, Second Edition, as "A group of organic compounds of the type RXHy which are isologs of ammonium and contain the element X in its highest valency; where X is pentavalent as in ammonium, phosphonium, arsonium and stibonium, where X is tetravalent as in oxonium, sulphonium, solenonium and stanonium compounds and, where X is trivalent, as in iodonium compounds."

They may be considered as addition compounds, this being further described under the heading of oxonium, carbonium, stibonium, -inium, and -ylium.

The cation-modified clay may be produced for example by converting the organic bases to the salts formed by the addition of an acid such as hydrochloric acid or acetic acid dissolved in water, and adding the selected onium compound to an aqueous clay dispersion.

The clays to be used in the preparation of the organophilic cation-modified clay have an exchangeable inorganic cation and are preferably those which originally exhibit a base exchange capacity of at least 40 millilitres per 100 grams of the clay for example the bentonite group of clays which are composed principally of minerals of the montmorillonite group (including montmorillonite, hectorite, saponite and nontronite), are particularly suitable. Other base exchange materials may however be used.

Furthermore, an organophilic cation-modified clay which may be used in accordance with the invention is one obtained by reacting a clay, in which at least some of the exchangeable ions other than sodium have been replaced by sodium ions, with an onium compound.

Details of the preparation of organophilic cation-modified clays are given in United Kingdom Patents Nos. 664,830, 782,724 and 904,880 and U.S.A. Patent No. 2,531,440.

Examples of organophilic cation-modified clays which may be used are dimethyldioctadecyl ammonium montmorillonite, dodecylamine montmorillonite and dimethyldioctadecyl ammonium hectorite.

The volatile liquid organic vehicle facilitates the application and deposition of a film of the organophilic clay on the surfaces of the metal to be formed. As the vehicle is to be removed (from the coating composition applied to the metal) prior to the forming operation, organic vehicles of low and medium boiling point are preferred to those of high boiling point. Among liquid organic vehicles of low boiling point (i.e., boiling under 100° C. at atmospheric pressure) mention may be made of aliphatic and alicyclic compounds (including halogenated compounds), such as ethyl alcohol (including methylated spirit), methyl acetate, butyl chloride, trichloroethylene, 1:1:1-trichloroethane, acetone and cyclohexane, as well as aromatic compounds such as benzene and petroleum naphtha. Medium boiling point organic vehicles (i.e., those boiling between 100 and 150° C. at atmospheric pressure) include n-amyl alcohol, n-butyl acetate and cyclohexanone as well as toluene, xylenes, monochlorobenzene and tetrahydrofurfuryl alcohol. High boiling point organic vehicles include acetonyl acetonate, butyl butyrate and benzyl alcohol. Examples of other volatile liquid organic vehicles suitable for use in accordance with the invention are given in "Industrial Solvents," by I. Mellan (1950), pp. 36 to 42.

It may often be advantageous in practice to use two or more volatile vehicles.

As examples of said non-volatile organic additives mention may be made of: synthetic resins, such as acrylic resins (e.g., "Bedacryl," 122X manufactured by Imperial Chemical Industries Ltd.), alkyd resins (e.g., "Epok" C. 460 manufactured by British Resin Products Ltd.), silicone resins (e.g., M.S. 805, manufactured by Midland Silicones Ltd.) and chlorinated rubber; natural resins, such as rosin, dammar and shellacs; synthetic waxes, such as the Seekay waxes sold by Imperial Chemical Industries Ltd., Abril waxes sold by Abril Industrial Waxes Ltd., and chlorinated polyethylene; natural waxes; such as carnauba wax, shellac wax, palm and cotton seed waxes; organic substances having lubricant properties and capable of forming a dry film, such as solid saturated and unsaturated carboxylic acids (e.g., lauric, stearic, m-toluic, sebacic and fumaric acids), solid esters of saturated and unsaturated carboxylic acids (e.g., ditetradecyl sebacate) solid alcohols and glycerides (e.g., cetyl alcohol, $\beta$-monopalmitin and $\alpha$-monostearin); mention may also be made of halogenated polynuclear compounds, for example, bi- and polyphenyls (e.g., the mixtures sold by Monsanto Ltd. under the trade name "Arochlor"); liquid organic esters capable of forming a dry film and drying and semi-drying oils, e.g., cotton seed oil. More than one such additive may be used in the coating composition if desired and it may often be convenient to introduce the additive into the other components of the coating composition in an organic solvent—particularly when the commercially available form of the additive comprises the additive in an organic solvent (as is the case, for example, with "Bedacryl" 122X).

If the coated metal is to be heat treated after forming, then the non-volatile additive should be such that it will burn off without leaving a carbon deposit or contaminating the metal surface in any deleterious way. The "Arochlors," for example, would not be used if the formed metal is to be subjected to heat treatment.

The proportions of said clay, volatile vehicle and non-volatile additive to be employed in coating compositions to be used according to the process of the invention may be varied within wide limits, preferably 2 to 10 parts by weight of said clay, 50 to 300 parts by weight of volatile vehicle and 0 to 30 parts by weight of non-volatile additive. The criterion in determining these proportions is the ease with which an adequate film of the organophilic cation-modified clay (and the non-volatile additive when present) is formed on the metal surface. Generally speaking the film of the dried coating should be not less than about 4 to 5 microns in thickness, but preferably is between 5 and 10 microns. Clearly it is possible to apply to the metal to be formed a coating composition containing only minute amounts of those components destined to provide the dry film, and to repeat such applications of coating composition until the desired thickness of dry film has been built up on the metal surfaces. In practice, however, it is usually more convenient to apply a minimum number of coatings to the metal and a coating composition having a concentration of about 30 grams of organophilic cation-modified clay per litre of volatile organic vehicle may be used with advantage.

In a process according to the invention in which a non-volatile additive forms part of the coating composition good results have been obtained when said additive is present in an approximately equal amount by weight to the weight of organophilic cation-modified clay present in the composition.

The metal surfaces to be treated may be degreased, if necessary, first by paraffin washing if particularly greasy and then by a trichlorethylene vapour degreasing process to remove organic materials and any paint present may be removed by a paint stripper such as methylene chloride. In the case of titanium alloys, if these are of the type which canot be degreased in trichlorethylene vapour, because of stress corrosion, an alkaline degreaser may be used.

When sheet metal parts are to be shaped it may be necessary to carry out a forming operation in which frictional forces must be overcome. The current practice is to use a heavy oil with additives which give a high pressure lubricant. After forming, this drawing lubricant must be removed by some form of degreasing before the item is heat treated. When deep drawing bright annealed strip, this type of lubricant is often satisfactory, but trouble is experienced when deep drawing highly alloyed steel, and titanium alloys, and the materials sold under the registered trademark "Nimonic." When using oil based lubricants on these alloys the lubricants break down giving high point contact between the metal blank being worked and the die, this causing scuffing to the walls of the pressing and damage to the die which is progressive.

During the process according to the invention, however, there is no metal-to-metal contact, no scuffing takes place, tool wear is reduced considerably, and in those cases wherein the forming operation is followed by a heat treatment step, the dry film according to the invention acts as a protective coating to reduce scale formation usually associated with such heat treatment. Dispersion of the components of the coating compositions may be achieved by using standard equipment such as a colloid mill or a ball mill.

The following examples illustrate the invention. In the examples all the percentages are by weight except where otherwise stated.

*Example 1*

15 gm. of dimethyldioctadecyl ammonium montmorilonite of the grade sold as "Bentone 34" were milled with 1 gm. of oil-soluble dye, added to indicate of coverage, and 300 ml. of toluene in a stainless steel ball mill using stainless steel balls for 4 hours. This mixture was diluted with 200 ml. of toluene and again milled for half-an-hour to give a mixture of 30 gm. per litre of "Bentone 34" in toluene. To this mixture was added 25 ml. of MS 805 to give a mixture of 5 parts by volume of MS 805 in 100 parts of the "Bentone 34" toluene mixture.

A 4" diameter blank of steel containing 17% of chromium and 8% of nickel was treated as follows:

(1) The metal surface being particularly greasy, was paraffin washed and then trichlorethylene vapour degreased to remove any organic materials. Paint was removed by a suitable paint stripper.

(2) A soon as possible after step (1) the surfaces of the blank were sprayed with one coat of the mixture prepared as above. The coating was allowed to dry in air for 10 minutes.

(3) The blank was formed using a 2" punch and a blank holder pressure of 60 lbs./sq. in. to give a 50% reduction in diameter.

(4) The pressing formed was then heat treated at 1050° C. for 10 minutes making sure that there was a free air circulation around the metal surfaces. The pressing was then air cooled.

(5) The pressing was then immersed in a solution of 200 gms./litre of ferric sulphate and 50 gms. per litre of hydrofluoric acid at 60° C. for 2 minutes.

(6) The pressing was sprayed with high pressure water and dried.

*Example 2*

Example 1 was repeated but using 25 ml. of "Bedacryl" 122X instead of the silicone resin MS 805.

*Example 3*

Example 1 was repeated but using xylene instead of toluene.

The process according to Examples 1 to 3 is an improvement on current practice in the following respects:

(a) Blanks to be formed were coated with the mixture, dried, and racked in storage.

(b) Operators were not constantly handling oily blanks, and presses were worked free of oil.

(c) Tool wear was reduced.

(d) No degreasing was necessary after forming.

(e) The coating, by preventing oxidation, reduced the thickness of the oxide coating normally formed and enabled the time taken normally to remove scale to be reduced from 15 minutes to 2 minutes.

*Example 4*

15 gm. of dimethyldioctadecyl ammonium montmorilonite of the grade sold as "Bentone 34" were milled with 1 gm. of oil-soluble dye, added to indicate coverage, and 300 ml. of toluene in a stainless steel ball mill using stainless steel balls for 4 hours. To this mixture was then added 42 gm. of stearic acid and 300 ml. of toluene and again milled for half-an-hour to give a mixture of 30 gm. per litre "Bentone 34" and 70 gm. per litre stearic acid in toluene. To this mixture was added 30 ml. of MS 805 to give a mixture of 5 parts by volume of MS 805 in 100 parts by volume of the "Bentone 34" stearic acid mixture.

A 4" diameter blank of titanium copper alloy I.C.I. 230 was treated as follows:

(1) The blank was treated with the alkaline degreaser sold commercially under the trade mark "Orthosil" (this is available from Staveley Iron and Chemical Co. of Staveley, near Chesterfield, England). This was followed by swilling in hot water and allowing to air dry.

(2) As soon as possible after step (1) the surfaces of the blank were sprayed with one coat of the mixture prepared as above. The coating was allowed to dry in air for 10 minutes.

(3) The blank was formed using a 2″ punch and a blank holder pressure of 60 lbs./sq. in. to give a 50% reduction in diameter.

(4) The pressing formed was then heat treated at 600° C. for 30 minutes making sure that there was a free air circulation around the metal surfaces. The pressing was then air cooled.

(5) The pressing was then immersed in a solution of 200 gm. per litre of ferric sulphate and 20 gm. per litre of hydrofluoric acid at 60° C. for 30 minutes.

(6) The pressing was sprayed with high pressure water and dried.

The process according to Example 4 is an improvement on current practice in the following respects:

(a) Blanks to be formed were coated with the mixture, dried and racked in storage.

(b) Operators were not constantly handling oily blanks, and presses were worked free of oil.

(c) Using conventional lubricants it was impossible to obtain a 50% reduction in a diameter on titanium alloys.

(d) Tool wear was reduced.

(e) No degreasing was necessary after forming.

(f) The coating by preventing oxidation reduced the thickness of the oxide coating normally formed and enabled the scale to be removed by an acid pickle instead of a wet abrasive blast.

*Example 5*

A mixture was prepared as in Example 4 but using 42 gm. of ditetradecyl sebacate instead of stearic acid.

A 4″ diameter blank of a nimonic alloy known as "Nimonic 75" was treated as follows:

(1) The metal surface being particularly greasy, was paraffin washed and then degreased with trichlorethylene vapour to remove any organic materials. Paint was removed by a suitable paint stripper.

(2) As soon as possible after step (1) the blank was dipped into a mixture prepared as above and withdrawn to given an even coating. The surface was allowed to dry in air for 10 minutes.

(3) The blank was formed using a 2″ punch and a blank holder pressure of 60 lbs./sq. in. to give a 50% reduction in diameter.

(4) The pressing formed was then heat treated at 1050° C. for 10 minutes, making sure that there was a free air circulation around the metal surfaces. The pressing was then air cooled.

(5) The pressing was then immersed in a solution of 200 gm. per litre of ferric sulphate and 50 gm. per litre of hydrofluoric acid at 60° C. for 30 minutes.

(6) The pressing was sprayed with high pressure water and dried.

The process according to Example 5 is an improvement on current practice in the following respects:

(a) Blanks to be formed were coated with the mixture, dried and racked in storage.

(b) Operators were not constantly handling oil blanks, and presses were worked free of oil.

(c) Tool wear was reduced.

(d) No degreasing was necessary after forming.

(e) The coating by preventing oxidation reduced the thickness of the oxide coating normally formed and enabled the time normally taken to remove scale to be reduced from 4–5 hours to 30 minutes.

*Example 6*

30 gm. of dimethyldioctadecyl ammonium montmorillonite of the grade sold under the registered trademark "Bentone 34" were milled with 2 gm. of oil soluble dye (Waxoline Red), added to indicate coverage, and 600 gm. of toluene in a stainless steel ball mill using stainless steel balls for 4 hours. This mixture was diluted with 400 gm. of toluene and again milled for half-an-hour.

A circular blank of steel containing 18% of chromium and 8% of nickel was treated as follows:

(1) The metal surface being particularly greasy was paraffin washed and then degreased with trichlorethylene vapour to remove organic materials. Paint was removed by a suitable painter stripper.

(2) As soon as possible after step (1) the surfaces of the blank were sprayed with one coat of the mixture prepared as above. The coating was allowed to dry in air for 10 minutes.

(3) The blank was formed into a cup to give a 50% reduction in diameter.

(4) The pressing formed was then heat treated at 1050° C. for 10 minutes making sure that there was a free air circulation around the metal surfaces. The pressing was then cooled in air.

(5) The pressing was then immersed in a solution of 200 gm./litre of ferric sulphate and 50 gm./litre of hydrofluoric acid at 60° C. for 2 minutes.

(6) The pressing was sprayed with high pressure water and dried.

*Example 7*

30 gm. of a zeolitic clay-organic amine complex sold under the registered trademark "Bentone 27" were milled with 2 gm. of oil soluble dye (Waxoline Red) added to indicate coverage, and 600 gm. of toluene in a stainless steel ball using stainless steel balls for 4 hours. This mixture was diluted with 400 gm. of toluene and again milled for half-an-hour.

A circular blank of titanium/copper alloy containing 2% of copper and the balance titanium, except for impurities, the impurities being, namely, carbon up to 0.1%, hydrogen up to 0.01% and iron up to 0.2% was treated as follows:

(1) The blank was degreased using the alkaline degreaser sold commercially under the trademark "Orthosil" (available from Staveley Iron & Chemical Co. Ltd. of Staveley, near Chesterfield), followed by swilling in hot water and allowed to dry.

(2) As soon as possible after step (1) the surfaces of the blank were sprayed with one coat of the mixture as prepared above. The coating was allowed to dry in air for 10 minutes.

(3) The blank was formed into a cup to give a 50% reduction in diameter.

(4) The pressing formed was then heat treated at 800° C. for 10 minutes, making sure that there was a free air circulation around the metal surfaces. The pressing was then cooled in air.

(5) The pressing was then immersed in a solution of 200 gm./litre of ferric sulphate and 25 gm./litre of hydrofluoric acid at 60° C. for 10 minutes.

(6) The pressing was sprayed with high pressure water and dried.

*Example 8*

30 gm. of dimethyldioctadecyl ammonium hectorite sold under the registered trademark "Bentone 38" were milled with 2 gm. of oil soluble dye (Waxoline Red), added to indicate coverage, and 600 gm. of toluene in a stainless steel ball mill using stainless steel balls for 4 hours. This mixture was diluted with 400 gm. of toluene and again milled for half an hour.

A circular blank of titanium/copper alloy containing 2% of copper and the balance titanium, except for impurities, the impurities being, namely, carbon up to 0.1%, hydrogen up to 0.01% and iron up to 0.2%, was treated as follows:

(1) The blank was degreased using the alkaline degreaser sold commercially under the trademark "Orthosil" (available from Staveley Iron & Chemical Co. Ltd., of Staveley, near Chesterfield) followed by swilling in hot water and allowed to dry.

(2) As soon as possible after step (1) the surfaces of the blank were sprayed with one coat of the mixture as prepared above. The coating was allowed to dry in air for 10 minutes.

(3) The blank was formed into a cup to give a 50% reduction in diameter.

(4) The pressing formed was then heat treated at 800° C. for 10 minutes, making sure that there was a free air circulation around the metal surfaces. The pressing was then cooled in air.

(5) The pressing was then immersed in a solution of 200 gm./litre of ferric sulphate and 25 gm./litre of hydrofluoric acid at 60° C. for 10 minutes.

(6) The pressing was sprayed with high pressure water and dried.

*Example 9*

Example 8 was repeated but using "Bentone 27" instead of "Bentone 38" with the additional modification that 10 gm. of methyl alcohol was added together with the 600 gm. of toluene.

*Example 10*

30 gm. of "Bentone 34" were milled with 2 gm. of oil soluble dye (Waxoline Red) added to indicate coverage, and 600 gm. of toluene in a stainless steel ball mill using stainless steel balls for 4 hours. This mixture was diluted with 400 gm. of toluene, 50 gm. of Arochlor 1268 added and again milled for half-an-hour.

A circular blank of steel containing 18% of chromium and 8% of nickel was treated as follows:

(1) The metal surface being particularly greasy, was paraffin washed and degreased with trichlorethylene vapour to remove organic material. Paint was removed by a suitable paint stripper.

(2) As soon as possible after step (1) the surfaces of the blank were sprayed with one coat of the mixture prepared as above. The coating was allowed to dry in air for 10 minutes.

(3) The blank was formed into a cup to give a 50% reduction in diameter.

*Example 11*

Example 10 was repeated but using 50 gm. of Arochlor 5460 instead of 50 gm. of Arochlor 1268.

*Example 12*

30 gm. of "Bentone 34" were milled with 2 gm. of oil soluble dye (Waxoline Red) added to indicate coverage, and 600 gm. of toluene in a stainless steel ball mill using stainless steel balls for 4 hours. This mixture was diluted with 400 gm. of toluene, 50 gm. of sebacic acid added and again milled for half-an-hour.

A circular blank of the alloy known as Nimonic 75 was treated as follows:

(1) The metal surfaces being particularly greasy, were paraffin washed and then degreased with trichlorethylene vapour to remove organic materials. Paint was removed by a suitable paint stripper.

(2) As soon as possible after step (1) the surfaces of the blank were sprayed with one coat of the mixture prepared as above. The coating was allowed to dry in air for 10 minutes.

(3) The blank was formed into a cup to give a 50% reduction in diameter.

(4) The pressing formed was then heat treated at 1050° C. for 10 minutes, making sure that there was a free air circulation around the metal surfaces. The pressing was then cooled in air.

(5) The pressing was then immersed in a solution of 200 gm./litre of ferric sulphate and 50 gm./litre of hydrofluoric acid at 60° C. for 20 minutes.

(6) The pressing was sprayed with high pressure water and dried.

*Example 13*

Example 12 was repeated but using 50 gm. of M-toluic acid instead of 50 gm. of sebacic acid.

*Example 14*

50 gm. of "Bentone 34" were milled with 1 gm. of oil soluble dye (Waxoline Green) added to indicate coverage, and 1000 gm. of trichlorethylene in a stainless steel ball mill using stainless steel balls for 4 hours. This mixture was diluted with 460 gm. of trichlorethylene, 35 gm. of stearic acid and 49 gm. of "Bedacryl 144 TL" were added and the mix again milled for half-an-hour.

A circular blank of steel containing 18% of chromium and 8% of nickel was treated as follows:

(1) The metal surface being particularly greasy was paraffin washed and then degreased with trichlorethylene vapour to remove organic materials. Paint was removed by a suitable paint stripper.

(2) As soon as possible after step (1) the surfaces of the blank were sprayed with one coat of the mixture prepared as above. The coating was allowed to dry in air for 10 minutes.

(3) The blank was formed into a cup to give a 50% reduction in diameter.

(4) The pressing formed was then heat treated at 1050° C. for 10 minutes, making sure that there was a free air circulation around the metal surfaces. The pressing was then cooled in air.

(5) The pressing was then immersed in a solution of 200 gm./litre of ferric sulphate and 50 gm./litre of hydrofluoric acid at 60° C. for 2 minutes.

(6) The pressing was sprayed with high pressure water and dried.

What is claimed is:

1. A process for forming metals comprising coating the metal with at least one layer of a sprayable coating composition consisting essentially of a mixture of from 2 to 10 parts by weight of an organophilic cation-modified clay, from 50 to 300 parts by weight of a volatile vehicle therefor and from 0 to 30 parts by weight of a non-volatile organic adhesive capable of forming a dry film when mixed with the organophilic cation-modified clay, removing substantially all the vehicle from the coating to leave a dry film of clay on the metal and forming the metal whereby the dry film will act as a lubricant during the forming step.

2. A process for forming metals comprising coating the metal with at least one layer of a sprayable coating composition consisting essentially of a mixture of from 2 to 10 parts by weight of an organophilic cation-modified clay, from 50 to 300 parts by weight of a volatile vehicle therefor and from 0 to 30 parts by weight of a non-volatile organic lubricant capable of forming a dry film when mixed with the organophilic cation-modified clay, removing substantially all the vehicle from the coating to leave a dry film of clay on the metal and forming the metal whereby the dry film will act as a lubricant during the forming step.

References Cited by the Examiner
UNITED STATES PATENTS

| | | | |
|---|---|---|---|
| 2,430,083 | 11/1947 | Sherman | 80—60.6 |
| 2,530,838 | 11/1950 | Orozco | 113—51 |
| 2,531,440 | 11/1950 | Jordan | 252—28 |
| 2,708,379 | 5/1955 | Pakkala | 13—51 |
| 3,030,305 | 4/1962 | Murray | 252—28 |
| 3,066,098 | 11/1962 | Nichols | 207—10.1 |
| 3,115,249 | 12/1963 | Zouraeff | 252—28 |

MARCUS U. LYONS, *Primary Examiner.*